United States Patent [19]

Gibbs

[11] 4,269,301

[45] May 26, 1981

[54] CONVEYOR BELT SCRAPER SYSTEM

[76] Inventor: Alfred S. Gibbs, Box 719, R.D. 3, Coopersburg, Pa. 18036

[21] Appl. No.: 87,094

[22] Filed: Oct. 22, 1979

[51] Int. Cl.³ .............................................. B65G 45/00
[52] U.S. Cl. .................................................... 198/499
[58] Field of Search ...................... 198/497, 498, 499; 15/256.5, 256.51, 256.6

[56] References Cited

U.S. PATENT DOCUMENTS

| 3,722,667 | 3/1973 | Olson | 198/499 |
|---|---|---|---|
| 4,189,046 | 2/1980 | Ward | 198/499 |

FOREIGN PATENT DOCUMENTS 1451759  10/1976  United Kingdom ...................... 198/499

Primary Examiner—James L. Rowland
Attorney, Agent, or Firm—Jack Schuman

[57] ABSTRACT

Muck and very wet material is removed from the surface of a moving conveyor belt by means of three scraper assemblies adjacent the head pulley of a conveyor belt installation. Each scraper assembly has a resilient, normally flat scraper blade with a tapered side, the opposite side being supported on an angle secured at each end to an operating lever which may be rotated by an air cylinder to engage the tapered side of the scraper blade with, and to flex the scraper blade against, the moving conveyor belt. The pressures in the air cylinders are adjusted so that the first scraper blade receives the greatest flexing force, and the second scraper blade a lesser flexing force, and the third scraper blade the least flexing force. This is done by supplying the air cylinders through progressively differently set pressure reducing valves connected to a common compressed air main.

1 Claim, 3 Drawing Figures

U.S. Patent
May 26, 1981
4,269,301
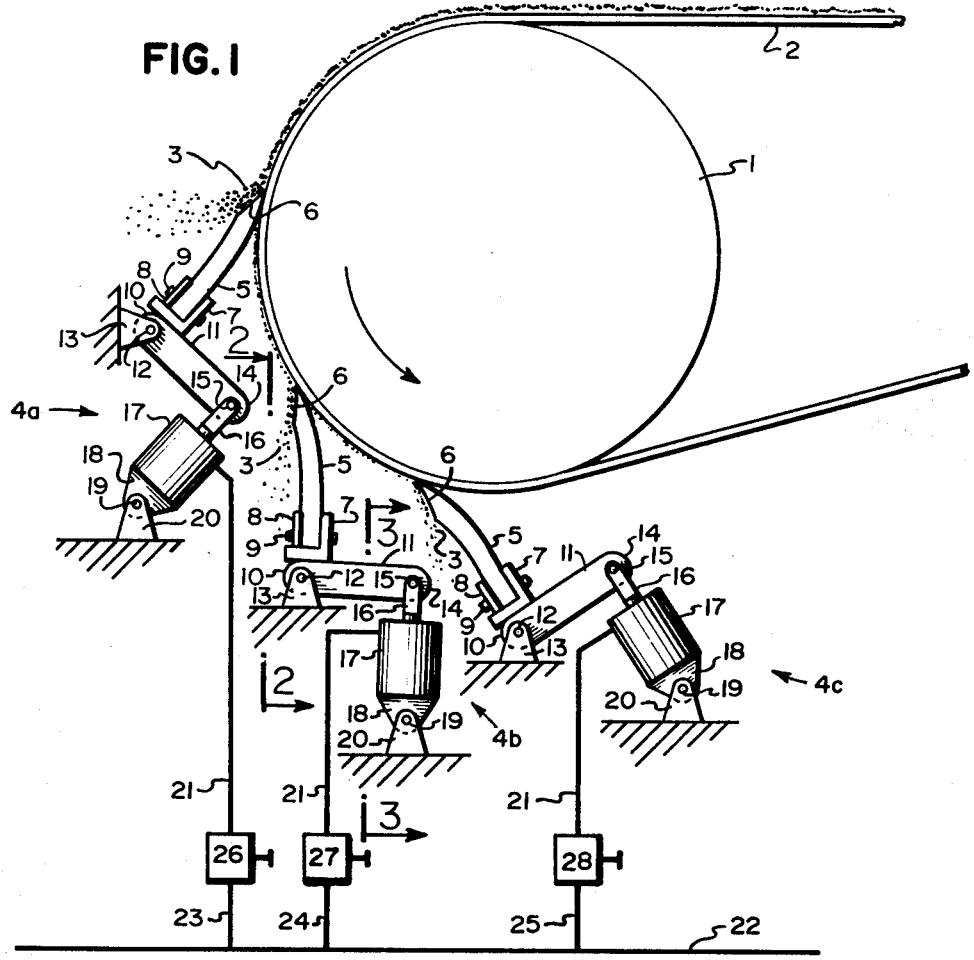
FIG. 1
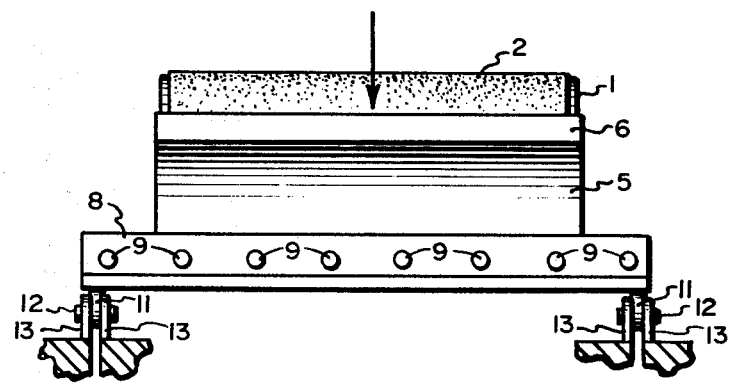
FIG. 2
FIG. 3

CONVEYOR BELT SCRAPER SYSTEM

BACKGROUND OF THE INVENTION

1. Field of the Invention

This invention relates broadly to an improved scraper system for cleaning conveyor belts. More specifically, this invention relates to an improved scraper system embodying resilient tapered blades held and flexed by air cylinders against a moving conveyor belt as it passes around a head pulley of a conveyor belt installation to remove muck and very wet material from the conveyor belt.

2. Description of the Prior Art

Conveyor belt cleaning systems have long been known and used.

Thus, U.S. Pat. No. 3,047,133 (1962) to Searles shows a plurality of pairs of resilient discs held together by backing discs of smaller diameter, which resilient discs are mounted for rotation on a shaft and which are so urged towards engagement with the conveyor belt that the said resilient discs spread apart from each other beyond the diameters of their respective backing discs, thus presenting rotating circular segments to the face of the conveyor belt and thereby effecting the desired cleaning action. This design, while good for cleaning granulated gritty substances from the conveyor belt, has not proven to be totally satisfactory for removing muck and very wet materials from the conveyor belt.

Scrapers are also commonly used to clean conveyor belts, but are blunt and not tapered where they engage the belts. When in operation against a moving conveyor belt from which material is to be removed, the material has a tendency to chew out or erode the leading edges of the scrapers forming pockets between the scrapers and the conveyor belt, and to remain in the pockets, causing a smear action and carry-back, thus reducing cleaning efficiency.

Various mechanical means, such as ratchet mechanisms, threaded mountings, springs and counterweights have been employed to hold the above mentioned scrapers against the moving conveyor belt, but none provides for constant adjustment of scraper position at a substantially fixed degree of flexing across the entire width of the moving conveyor belt whereby the entire surface of the belt is scraped clean despite wear on the scrapers and unevenness or other on-uniformity of the belt or of the head pulley under the belt.

SUMMARY OF THE INVENTION

One of the objects of this invention is to provide an improved scraper system for cleaning moving conveyor belts, particularly of muck and very wet material.

Other and further objects of this invention will become apparent during the course of the accompanying specification and from the drawing and the appended claims.

Briefly, I have discovered that the foregoing objects may be attained by providing a flexible, tapered scraper blade of length sufficient to extend across the entire width of the conveyor belt to be cleaned, and by using air cylinders to flex the scraper blade against the entire width of the belt to force the leading edge of the tapered side against the said belt facing the oncoming material to be removed from the belt. The scraper blade can be used singly, or in series with other scraper blades, the degree of pressure in the air cylinders flexing each scraper blade being arranged in descending order in the direction of travel of the belt.

DESCRIPTION OF THE DRAWING

Referring now to the drawing in which like numerals represent like parts in the several views:

FIG. 1 represents a view in elevation, partially diagrammatic, of one end of a conveyor belt installation, showing a head pulley, a portion of the conveyor belt, three scrapers, and the pneumatic systems serving the scrapers.

FIG. 2 represents a section taken along the line 2—2 of FIG. 1, showing a portion of the conveyor belt, one of the three scrapers, and the operating levers and supporting brackets at each end of the scraper.

FIG. 3 represents a section taken along the line 3—3 of FIG. 1, showing an air cylinder, an operating lever connected to the air cylinder, and supporting brackets for the air cylinder.

DESCRIPTION OF THE PREFERRED EMBODIMENT

In a typical conveyor belt installation, head pulley 1, the direction of rotation of which is indicated diagrammatically by the arrow in FIG. 1, supports conveyor belt 2.

Conveyor belt 2 may carry muck and very wet material 3 which is to be removed from the belt 2 in an efficient manner by the present invention.

Three scraper assemblies 4a, 4b and 4c are shown, each comprising a normally flat scraper blade 5 of resilient material such as rubber or other suitable polymeric material and having a tapered side 6. The angle at the leading edge of the tapered side 6 is preferably 30° for most efficient removal of the muck or very wet material 3. The opposite side of the scraper blade 5 is supported between angle 7 and plate 8, bolts 9 being employed to draw the said angle 7 and plate 8 into firm engagement with opposite faces of the scraper blade 5. It will be understood that the depth of the pocket formed between angle 7 and plate 8 will be sufficient to permit application of a bending moment along the length of scraper blade 5 to flex the said scraper blade 5 against conveyor belt 2. Each end of angle 7 is secured as by welding to one end 10 of operating lever 11. This end 10 of operating lever 11 is rotatably mounted by means of bolt 12 between supporting brackets 13 which are fixed to any suitable and convenient supporting structure on or adjacent the conveyor belt installation, as indicated diagrammatically in FIGS. 1 and 2. It will be apparent that, when operating lever 11 rotated about bolt 12, scraper blade 5 will be moved toward and into engagement with conveyor belt 2 or away from engagement with conveyor belt 2. It will also be apparent that, when operating lever 11 is rotated sufficiently about bolt 12, scraper blade 5 can be brought into engagement with conveyor belt 2 with such force as will cause a desired degree of flexing in the scraper blade, as clearly shown in FIG. 1. Moreover, this degree of flexing, if sufficient, will insure that the leading edge of the tapered side 6 of scraper blade 5 engages the conveyor belt 2 across its entire width, and that there will be no gaps between the scraper blade 5 and the conveyor belt 2, despite variations in the surface of the conveyor belt 2 or head pulley 1.

The opposite end 14 of each operating lever 11 is rotatably mounted by means of bolt 15 in the forked end 16 of the piston rod of an air cylinder 17. The opposite end of air cylinder 17 is provided with an ear 18 rotatably mounted by means of bolt 19 between supporting brackets 20 which are fixed to any suitable and convenient supporting structure on or adjacent the conveyor belt installation, as indicated diagrammatically in FIGS. 1 and 3. In the embodiment shown, compressed air line 21 supplies compressed air to the head end of air cylinder 17 to force the piston rod downwardly into the said air cylinder 17, thereby tending to rotate operating lever 11 clockwise (with reference to FIG. 1) and thereby forcing the tapered side 6 of scraper blade 5 into engagement with, and thereby flexing scraper blade 5 against, the moving conveyor belt 2.

It will be apparent that the position of the air cylinder 17 can be reversed relative to operating lever 11, in which event compressed air would be supplied to that end of the air cylinder 17 opposite the head end thereof to rotate the operating lever 11 clockwise.

In any event, that end of air cylinder 17 not receiving compressed air may be left in communication with the atmosphere.

In the preferred embodiment, three scraper assemblies 4a, 4b and 4c are employed as shown in FIG. 1. The force applied to the operating levers of scraper assembly 4a is greater than that applied to the operating levers 11 of scraper assembly 4b which, in turn, is greater than the force applied to the operating levers of scraper assembly 4c. Operating levers 11 of the three scraper assemblies 4a, 4b and 4c being of the same length, the flexing force applied to the scraper blade 5 of scraper assembly 4a is greater than the flexing force applied to the scraper blade 5 of scraper assembly 4b which, in turn, is greater than the flexing force applied to the scraper blade 5 of scraper assembly 4c. This result may be accomplished by providing compressed air main 22 with branch air lines 23, 24 and 25 each leading to the inlet ports of pressure reducing valves 26, 27 and 28 respectively. Compressed air line 21 of scraper assembly 4a communicates with the outlet port of pressure reducing valve 26. Compressed air line 21 of scraper assembly 4b communicates with the outlet port of pressure reducing valve 27. Compressed air line 21 of scraper assembly 4c communicates with the outlet port of pressure reducing valve 28. Pressure reducing valve 26 is set to provide compressed air to compressed air line 21 of scraper assembly 4a at a higher pressure than pressure reducing valve 27 is set to provide compressed air to compressed air line 21 of scraper assembly 4b, and pressure reducing valve 28 is set to provide compressed air to compressed air line 21 of scraper assembly 4c at a lower pressure than pressure reducing valve 27. In this manner, scraper blade 5 of scraper assembly 4a, meeting muck and very wet material 3 on a wet conveyor belt 2, bears most forcefully of all the scraper blades 5 against the conveyor belt 2. Scraper blade 5 of scraper assembly 4b meets any residual muck and very wet material 3 on the now somewhat drier conveyor belt 2, and presses less forcefully against the conveyor belt 2. Scraper blade 5 of scraper assembly 4c meets any residual muck and wet material 3 passing the previous scraper blade 5 and remaining on the now much drier conveyor belt 2, and presses least forcefully of all the scraper blades 5 against the conveyor belt 2. This arrangement of reduced forces on the scraper blades 5 provides for efficient removal of muck and very wet material 3 from the surface of the conveyor belt 2 and compensates for the increasing dryness of the conveyor belt 2 as material 3 is removed therefrom, thereby to effectively regulate and control the pressure on the tapered sides 6 of the scraper blades 5 as a stepwise function of the said increasing dryness so as to reduce wear and tear on the said tapered sides 6.

It will be apparent that gases other than air may be employed to operate the cylinders 17. Air or other gases in the cylinders 17, because of their compressibility, permit the cylinders 17 to absorb intermittent shocks imparted to the scraper blades 5 at various times during operation, which shocks may be caused by imperfections in the conveyor belt 2 or the head pulley 1, by surge loads, or by foreign objects or the like other than the muck and very wet material 3 on the conveyor belt 2, while at the same time permitting the maintainance of a constant flexing force on the scraper blades 5. Cylinders 17 should not be operated with liquids which, because of their incompressibility, prevent the cylinders 17 from absorbing such shocks.

In operation, air cylinders 17 are pressurized to apply sufficient forces to the ends 14 of operating levers 11 in a clockwise direction (as viewed in FIG. 1) as to engage the tapered sides 6 of scraper blades 5 with, and flex the said scraper blades 5 against, the conveyor belt 2. The flexing force applied to scraper blade 5 of scraper assembly 4a is adjusted so as to be greater than the flexing force applied to scraper blade 5 of scraper assembly 4b which, in turn, is adjusted to be greater than the flexing force applied to scraper blade 5 of scraper assembly 4c. This is effected, as previously explained, by supplying compressed air at successively lower pressure to the air cylinders 17 of scrapper assemblies 4a, 4b and 4c respectively. With air cylinders 17 of the same bore, and with operating levers 11 of the same length, it has been found in practice that the preferred ratios of pressures in the air cylinders 17 of scraper assemblies 4a, 4b and 4c is, respectively, approximately 8:6:5 (e.g., 40 psi., 30 psi., and 25 psi.).

In the foregoing manner, muck and very wet material 3 is efficiently and effectively removed from the surface of a moving conveyor belt 2, with minimum wear and tear on the scraper blades 5 and the top cover of the belt 2. I claim:

1. Apparatus for scraping muck and very wet material from the surface of a moving conveyor belt, said apparatus comprising:
    (a) three scraper assemblies arranged one behind the other in the direction of travel of the conveyor belt, each scraper assembly comprising:
        (i) a resilient, normally flat, scraper blade of length sufficient to extend across the width of the conveyor belt and having a tapered side with a leading edge adapted to engage the said conveyor belt and scrape the said muck and very wet material therefrom,
        (ii) resilient means to force the leading edge of the tapered side of the scraper blade into engagement with, and to flex the scraper blade against, the said moving conveyor belt,
    (b) the leading edges of the tapered sides of the scraper blades being forced into engagement with, and the scraper blades being flexed against, the moving conveyor belt with forces decreasing in the direction of travel of the conveyor belt,
    (c) said resilient means comprising:
        (i) first means to support that side of said scraper blade opposite the tapered side thereof,
        (ii) operating lever means having a first end and a second end, (iii) second means to rotatably support the first end of said operating lever means,
(iv) said first means being secured to said operating lever means adjacent the first end thereof,
(v) an air cylinder having a head end and a bottom end,
(vi) third means rotatably supporting the bottom end of said air cylinder,
(vii) a piston rod in said air cylinder extending through the head end thereof,
(viii) fourth means rotatably mounting the free end of said piston rod to the second end of said operating lever means,
(ix) fifth means to pressurize said air cylinder and extend the piston rod therefrom,
(x) whereby actuation of said fifth means to pressurize said air cylinder operates said operating lever means to force the leading edge of the tapered side of the scraper blade into engagement with, and to flex the scraper blade against, the moving conveyor belt,
(d) the bores of the air cylinders of the resilient means of the three scraper assemblies all being equal.
(e) the lengths of the operating lever means of the resilient means of the three scraper assemblies all being equal,
(f) the ratio of pressures in the air cylinders of the resilient means of the three scraper assemblies, in the direction of travel of the conveyor belt, being approximately 8:6:5.

* * * * *